US008571582B2

(12) United States Patent
Lopez et al.

(10) Patent No.: US 8,571,582 B2
(45) Date of Patent: Oct. 29, 2013

(54) LTE SMART PAGING LIST

(75) Inventors: Javier M. Lopez, Alameda, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 443 days.

(21) Appl. No.: 12/939,691

(22) Filed: Nov. 4, 2010

(65) Prior Publication Data
US 2012/0115515 A1 May 10, 2012

(51) Int. Cl.
*H04W 68/00* (2009.01)
(52) U.S. Cl.
USPC ........... 455/458; 455/450; 455/515; 455/560; 370/311; 370/312
(58) Field of Classification Search
USPC ........... 455/458, 515, 450–453; 370/312, 311
See application file for complete search history.

(56) References Cited

U.S. PATENT DOCUMENTS

| 7,903,578 | B2 * | 3/2011 | Fischer | 370/252 |
|---|---|---|---|---|
| 8,139,530 | B2 * | 3/2012 | Herrero-Veron | 370/329 |
| 8,265,009 | B2 * | 9/2012 | Kamalaraj et al. | 370/328 |
| 8,331,224 | B2 * | 12/2012 | Meirosu et al. | 370/229 |
| 2010/0124223 | A1 * | 5/2010 | Gibbs et al. | 370/389 |
| 2010/0220680 | A1 * | 9/2010 | Ramankutty et al. | 370/329 |
| 2011/0098050 | A1 * | 4/2011 | Eipe et al. | 455/450 |
| 2011/0261715 | A1 * | 10/2011 | Norefors et al. | 370/252 |
| 2011/0294524 | A1 * | 12/2011 | Tontinuttananon et al. | 455/458 |
| 2012/0039313 | A1 * | 2/2012 | Jain | 370/338 |

* cited by examiner

*Primary Examiner* — Sharad Rampuria

(57) ABSTRACT

A device receives, at a particular time, instructions to send a page to user equipment. The device determines, based on a paging list, if the user equipment is associated with a particular serving base station for the particular time. When the user equipment is associated with the particular serving base station for the particular time, the device sends the page to the user equipment via the particular serving base station. When the user equipment is not associated with a serving base station for the particular time, the device sends the page to the user equipment via all base stations associated with a tracking area list for the user equipment.

16 Claims, 6 Drawing Sheets

FIG. 5

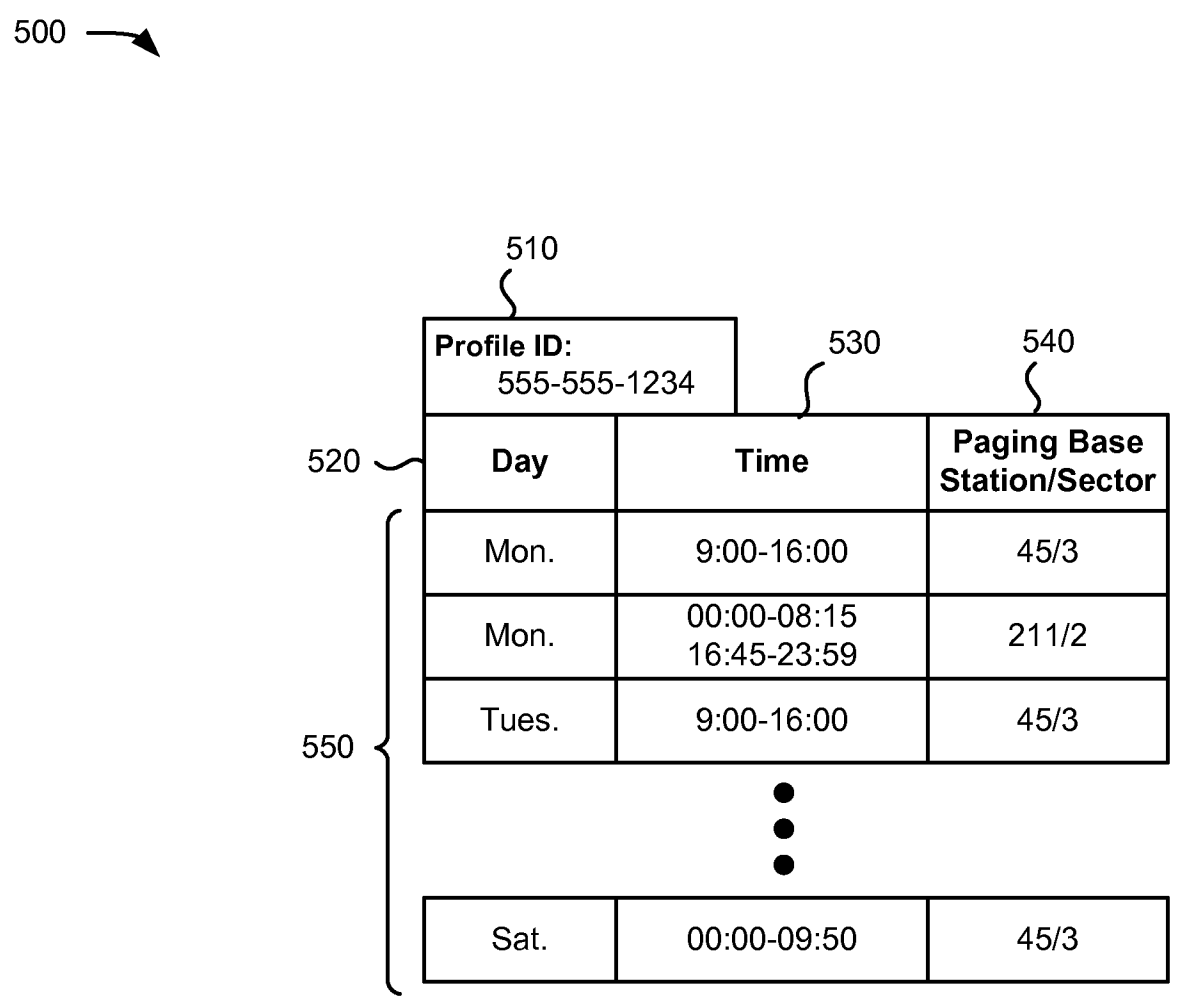

| Profile ID: 555-555-1234 | | |
|---|---|---|
| Day | Time | Paging Base Station/Sector |
| Mon. | 9:00-16:00 | 45/3 |
| Mon. | 00:00-08:15 16:45-23:59 | 211/2 |
| Tues. | 9:00-16:00 | 45/3 |
| ... | ... | ... |
| Sat. | 00:00-09:50 | 45/3 |

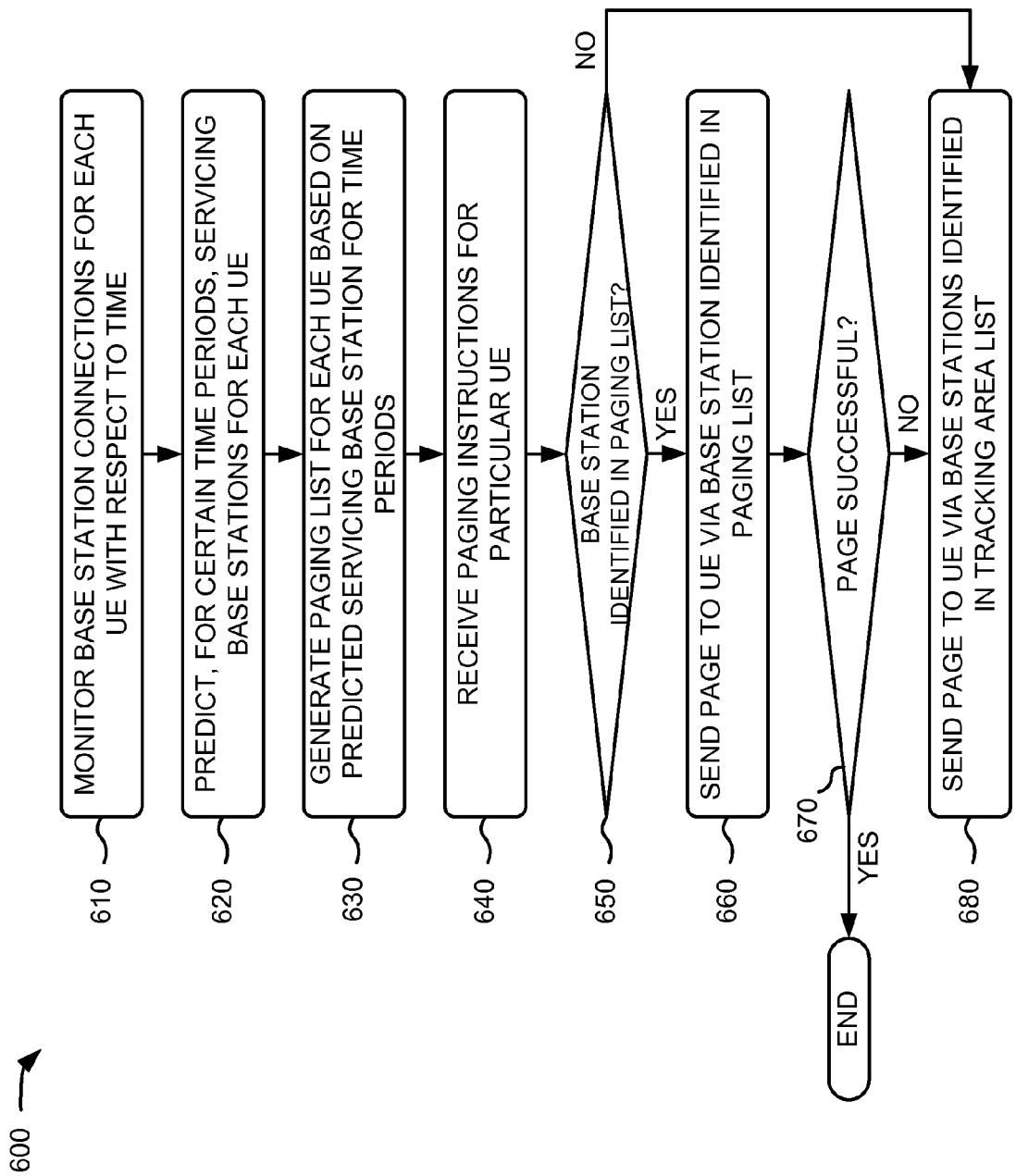

LTE SMART PAGING LIST

BACKGROUND

A Long Term Evolution (LTE) network (as defined by The Third Generation Partnership Project (3GPP)) may include a number of base stations (also referred to as "eNode Bs") connected to one or more mobility management entities (MME). LTE technology uses the concept of a tracking area (TA) and TA list. The TA is a static defined group, or set, of base stations configured on the MME. The TA list is simply a list of TAs visited by particular user equipment (UE). The TA list is dynamically created on the MME via TA updates (TAUs) sent to the MME as a UE moves from one base station and/or tracking area to another base station and/or tracking area. When an MME needs to page a UE, the MME sends the page using all base stations 130 of the tracking areas in which UE 110 is currently registered.

BRIEF DESCRIPTION OF THE DRAWINGS

FIG. 5 depicts a portion of an example data structure for a smart paging list capable of being generated and used by an MME depicted in FIG. 1; and FIG. 6 is a flow chart of an example process for efficiently paging user equipment according to an implementation described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may optimize UE paging, based on a TA list, by implementing a smart paging list. In one implementation, the smart paging list may be generated using schemes to predict UE location patterns based on user schedules and/or travel routines. The smart paging list may represent, for example, individual base stations or base station sectors where a UE is typically connected for a statistically significant time period. Thus, an MME may conserve network resources by paging an inactive UE through a single base station instead of multiple base stations that may be associated with a single tracking area list.

In one example implementation, the systems and/or methods may monitor wireless network connections between user equipment and base stations with respect to time. The systems and/or methods may predict, based on the monitoring, serving base stations for user equipment for particular time periods and may generate, based on the predicting, a smart paging list that associates particular user equipment with particular serving base stations for particular time periods. The systems and/or methods may receive, at a later time, instructions to send a page to a piece of user equipment. The systems and/or methods may determine, based on the smart paging list, if the piece of user equipment is associated with a serving base station for the particular time, and, if so, may send the page to the particular user equipment via that serving base station.

As used herein, the terms "subscriber" and/or "user" may be used interchangeably.

Furthermore, the terms "subscriber" and/or "user" are intended to be broadly interpreted to include a user device (e.g., a UE or another mobile communication device) or a user of a user device.

Figure 1:
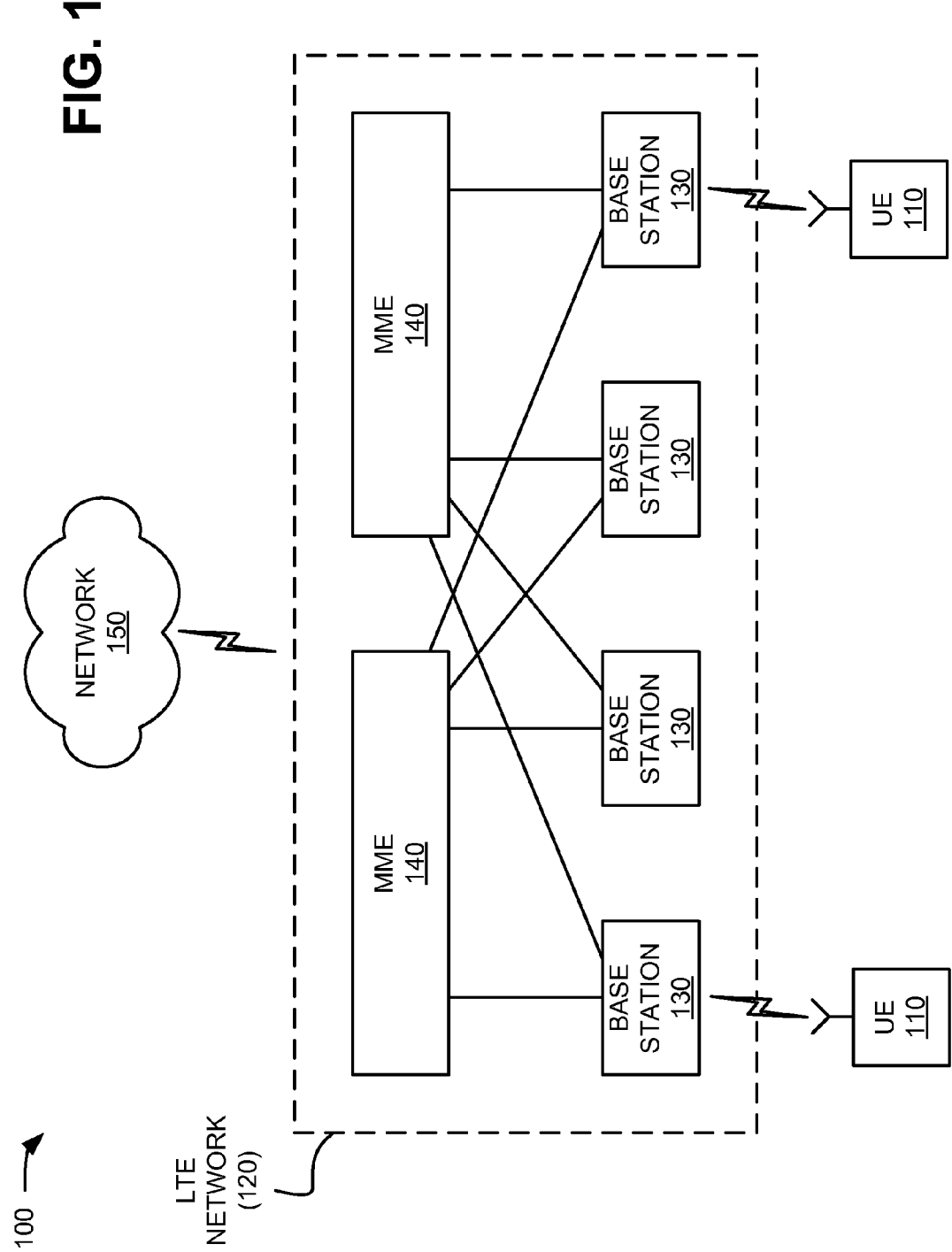
FIG. 1 is a diagram of an example network in which systems and/or methods described herein may be implemented.

FIG. 1 is a diagram of an example network 100 in which systems and/or methods described herein may be implemented. As illustrated, network 100 may include a group of user equipment (UE) 110 (referred to collectively, and in some instances individually, as "user equipment 110"); an LTE network 120 that includes a group of base stations 130 (referred to collectively as "base stations 130" and in some instances, individually as "base station 130") and a group of mobility management entities (MMEs) 140 (referred to collectively as "MMEs 140" and in some instances, individually as "MME 140"). Two pieces of user equipment 110, one LTE network 120 with four base stations 130 and two MMEs 140, and one network 150 have been illustrated in FIG. 2 for simplicity. In practice, there may be more UEs 110, LTE networks 120, base stations 130, MMEs 140, and/or networks 150. Also, in some instances, a device in network 100 (e.g., one or more of user equipment 110, base station 130, and/or MME 140) may perform one or more functions described as being performed by another component or group of components in network 100.

UE 110 may include any communication device that a user may use to connect to LTE network 120. For example, UE 110 may include a mobile communication device, such as a mobile phone, a personal digital assistant (PDA), a Global Positioning System (GPS) receiver or a media playing device with communication capabilities; a desktop device, such as a personal computer or a workstation; a laptop computer; a telephone terminal; or any other communication device or combinations thereof. In one implementation, UE 110 may be associated with a particular user (e.g., UE 110 may include a mobile phone).

LTE network 120 may include one or more devices for transmitting voice and/or data to/from user equipment 110 and network 150. For example, LTE network 120 may include radio access network (e.g., Evolved UMTS Terrestrial Radio Access Network (EUTRAN)) and an evolved packet core (EPC) network architecture specified in the 3GPP LTE standard. The radio access network of LTE network 120 may provide an interface between a base station 130 and a UE 110 at a particular geographic location. The EPC network of LTE network 120 may include nodes and functions that provide connectivity (e.g., Internet Protocol (IP) connectivity) for UE 110 (via base stations 130) to network 150 (e.g., for data, voice, and multimedia services). For example, the EPC network may include one or more MMEs 140. A particular MME 140 may interface with other MMEs 140 in LTE network 120 and may send and receive information associated with UE 110, which may allow one MME 140 to take over control plane processing of a UE 110 serviced by another MME 140, if the other MME 140 becomes unavailable. The EPC network may include other devices (not shown), such a serving gateway (SGW), a packet data network gateway (PGW), and a Home Subscriber Server (HSS).

Base station 130 may include one or more devices (e.g., an eNodeB) and other components and functionality that allow UE 110 to wirelessly connect to LTE network 120. Base station 130 may interface with LTE network 120 via a S1 interface, which may be split into a control plane S1-MME interface and a data plane S1-U interface. The S1-MME interface may interface with MMEs 140, while the S1-U interface may interface with another component of LTE network 120, such as a serving gateway (SGW) (not shown). Base station 130 may conduct handover and/or registration procedures with a mobile UE 110 as UE 110 moves from a coverage area of one base station 130 to a coverage area of another base station 130. In one implementation, coverage areas provided by base station 130 may be divided into multiple numbers (e.g., three) of sectors, such that a single base station 130 may provide coverage and track UE 110 connectivity within individual sectors.

MME 140 may include one or more devices that control and manage base stations 130. For example, MME 140 may implement tracking and paging procedures for UE 110, may activate and deactivate bearers for UE 110, may authenticate a user of UE 110, and may interface to non-LTE radio access networks. For an idle state UE 110, MME 140 may terminate a downlink data path and may trigger paging when downlink data arrives for user equipment 110. MME 140 may provide an idle mode user equipment tracking and paging procedure that includes retransmissions. MME 140 may manage tracking areas and tracking area lists for UE 110. A tracking area may be a static defined group, or set, of base stations 130 configured on MME 140. A tracking area list may be a list of tracking areas visited by a UE 110. MME 140 may dynamically create the tracking area list based on tracking area updates (TAUs) sent to MME 140 as a UE 110 moves from one base station 130 (e.g., within one tracking area) to another base stations 130 (in another tracking area). In implementations described herein, MME 140 may generate and update a smart paging list that predicts UE locations (e.g., within a tracking area) and targets paging attempts though a particular base station 130 (e.g., instead of a tracking area list that may include multiple base stations).

Network 150 may include a local area network (LAN), a wide area network (WAN), a metropolitan area network (MAN), an intranet, the Internet, a PLMN, a telephone network, such as the PSTN or a cellular telephone network, an IMS network, or a combination of networks. In one implementation, network 150 may provide voice services (e.g., voice over IP (VoIP) services) and data services (e.g., video streaming, music downloading, mobile television, etc.) to UE 110, via LTE network 120.

With respect to LTE network 120, UE 110 may maintain a connected state or an idle state. The location of UE 110 in the connected state can be known by MME 140 with an accuracy of a serving base station 130 coverage area (or cell). When in a connected state, UE 110 may provide periodic TAUs to LTE network 120 (e.g., MME 140) based on periodic expiration of a TAU timer. UE 110 may be registered in multiple tracking areas. All the tracking areas in a tracking area list to which UE 110 is registered may be served by the same MME 140. In an idle state, the location of UE 110 may be known by LTE network 120 to the level of precision of the tracking area list. However, according to implementations herein, a smart paging list may predict particular base stations (e.g., within a tracking area) that may be serving a targeted UE 110. Use of the smart paging list to conduct pages through a single base station 130 may provide for more efficient use of network resources than conducting pages using only a tracking area list. When a smart paging list is not available, or when a UE fails to respond to a page targeted through a particular base station, MME 140 may direct a page to UE 110 (e.g., in an idle state) using all base stations 130 of the tracking areas in which UE 110 is currently registered.

Although FIG. 1 shows example components of network 100, in other implementations, network 100 may include fewer components, different components, differently arranged components, and/or additional components than those depicted in FIG. 1. Alternatively, or additionally, one or more components of network 100 may perform one or more other tasks described as being performed by one or more other components of network 100.

Figure 2:
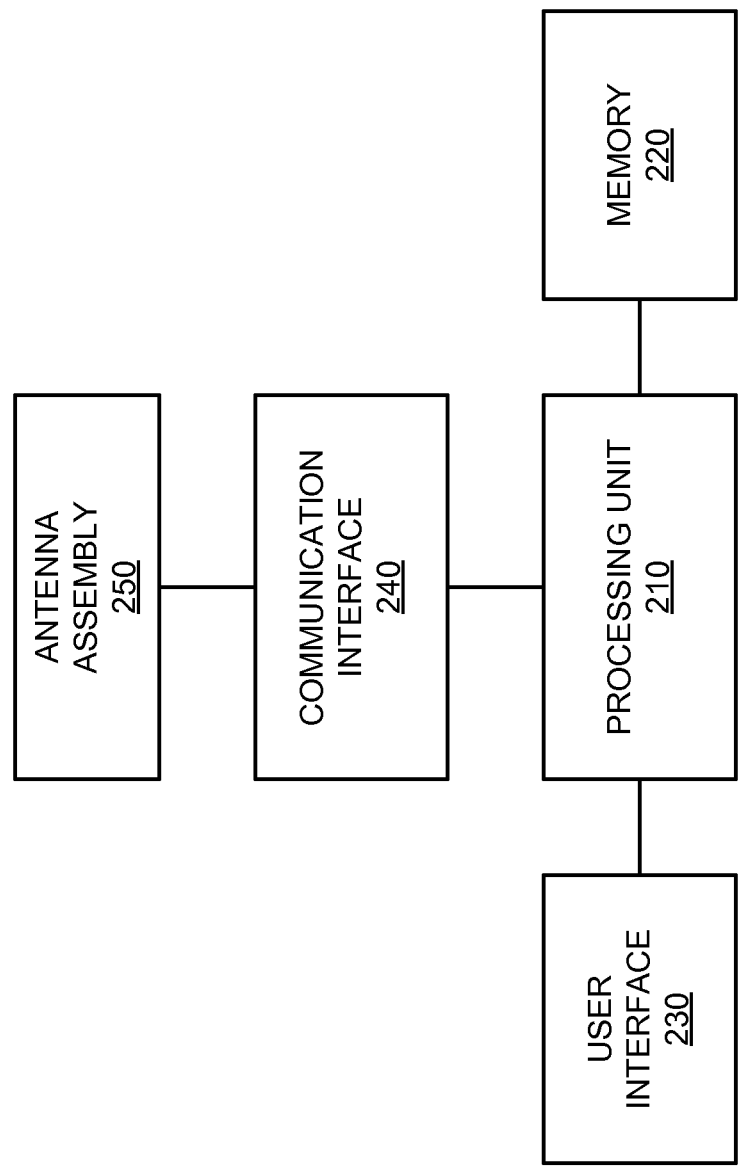
FIG. 2 depicts a diagram of example components of user equipment illustrated in FIG. 1.

FIG. 2 depicts a diagram of example components of a device 200 that may correspond to user equipment 110. As illustrated, device 200 may include a processing unit 210, memory 220, a user interface 230, a communication interface 240, and/or an antenna assembly 250.

Processing unit 210 may include one or more microprocessors, application-specific integrated circuits (ASICs), field-programmable gate arrays (FPGAs), or the like. Processing unit 210 may control operation of device 200 and its components. In one implementation, processing unit 210 may control operation of components of device 200 in a manner described herein.

Memory 220 may include a random access memory (RAM), a read-only memory (ROM), and/or another type of memory to store data and instructions that may be used by processing unit 210.

User interface 230 may include mechanisms for inputting information to device 100 and/or for outputting information from device 100. Examples of input and output mechanisms might include buttons (e.g., control buttons, keys of a keypad, a joystick, etc.) or a touch screen interface to permit data and control commands to be input into device 200; a speaker to receive electrical signals and output audio signals; a microphone to receive audio signals and output electrical signals; a display to output visual information (e.g., text input into device 200); a vibrator to cause device 200 to vibrate; etc.

Communication interface 240 may include, for example, a transmitter that may convert baseband signals from processing unit 210 to radio frequency (RF) signals and/or a receiver that may convert RF signals to baseband signals. Alternatively, communication interface 240 may include a transceiver to perform functions of both a transmitter and a receiver. Communication interface 240 may connect to antenna assembly 250 for transmission and/or reception of the RF signals.

Antenna assembly 250 may include one or more antennas to transmit and/or receive RF signals over the air. Antenna assembly 250 may, for example, receive RF signals from communication interface 240 and transmit them over the air, and receive RF signals over the air and provide them to communication interface 240. In one implementation, for example, communication interface 240 may communicate with a network (e.g., network 100) and/or devices connected to a network.

As will be described in detail below, device 200 may perform certain operations described herein in response to processing unit 210 executing software instructions of an application contained in a computer-readable medium, such as memory 220. A computer-readable medium may be defined as a physical or logical memory device. A logical memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
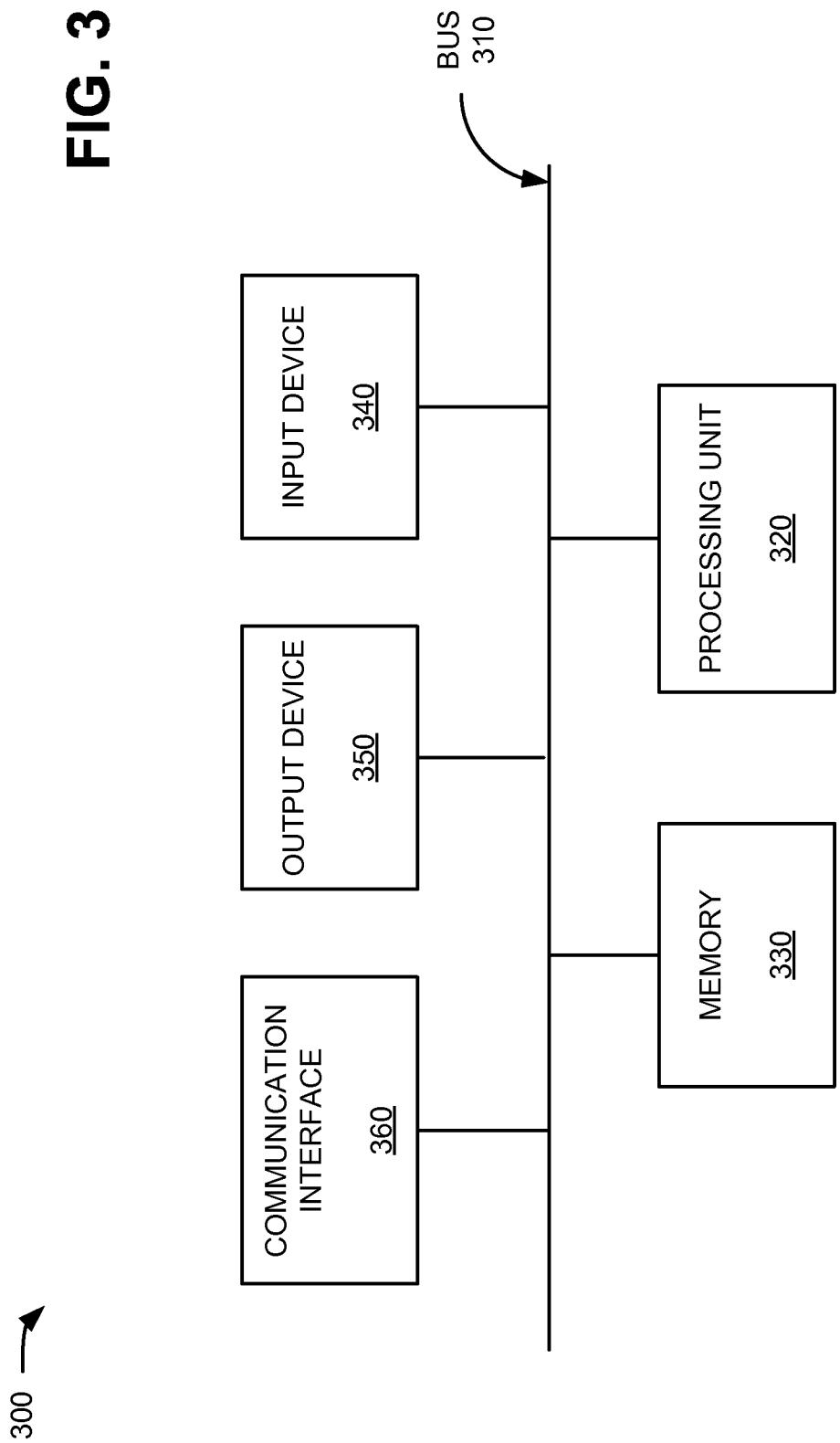
FIG. 3 illustrates a diagram of example components of a base station and/or a mobility management entity (MME) depicted in FIG. 1.

FIG. 3 illustrates a diagram of example components of a device 300 that may correspond to base station 130 and/or MME 140. As illustrated, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 100.

As described herein, device 300 may perform certain operations in response to processing unit 320 executing software instructions contained in a computer-readable medium, such as memory 330. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
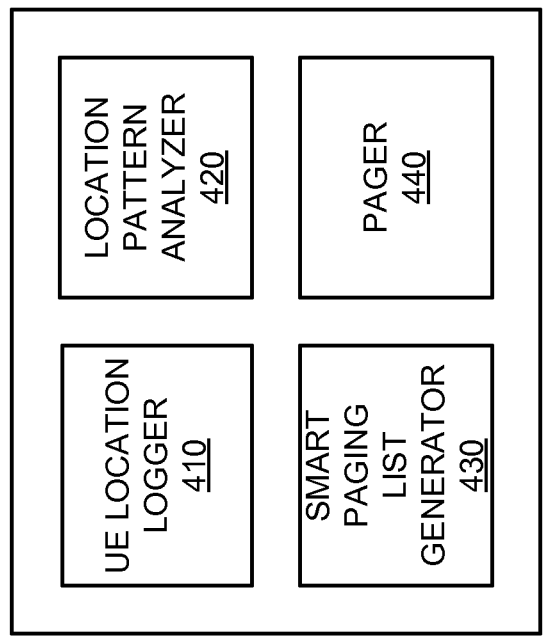
FIG. 4 depicts a diagram of example functional components of an MME depicted in FIG. 1.

FIG. 4 is a diagram of example functional components of MME 140. In one implementation, the functions described in connection with FIG. 4 may be performed by one or more components of device 300 (FIG. 3). As shown in FIG. 4, MME 140 may include a UE location logger 410, a location pattern analyzer 420, a smart paging list generator 430, and a pager 440.

UE location logger 410 may include hardware or a combination of hardware and software to track UE location information with respect to time. More particularly, UE location logger 410 may retrieve connection information from, for example, UE registration and handover procedures to identify a particular base station 130 that provides service to the UE at a particular time. In one implementation, UE location logger 410 may identify a particular portion of the service area of a base station 130 (e.g., a sector) that provides service to the UE at a particular time.

Location pattern analyzer 420 may include hardware or a combination of hardware and software to determine UE location patterns. For example, location pattern analyzer 420 may scan information from UE location logger 410 to determine statistically significant time periods when a UE (e.g., UE 110) can be predicted to be located within range of a base station 130 (or a base station sector). For example, a user of UE 110 may have consistent time periods at a place of business, at home, at a weekly meeting/event, etc. Location pattern analyzer 420 may identify what base station 130 (or base station sector) provides service to UE 110 during those consistent time periods.

Smart paging list generator 430 may include hardware or a combination of hardware and software to provide a data structure that may be used to direct paging attempts for a UE. For example, in one implementation, smart paging list generator 430 may generate a paging list, for each UE 110, that associates times (e.g., times that a page could be to be sent to UE 110) with particular base stations 130 (or base station sectors). The paging list may be associated with one or more particular time periods (e.g., business hours, weekends, evenings, lunch times, etc.) detected by location pattern analyzer 420, such that different base stations 130 may be used for paging attempts at the different time periods. For times that are not associated with a particular pattern, smart paging list generator 430 may default to paging based on the tracking area list associated with UE 110. An example smart paging list that may be generated by smart paging list generator 430 is described further in connection with, for example, FIG. 5.

Pager 440 may include hardware or a combination of hardware and software to page a UE based on a smart paging list. For example, when UE 110 is in an idle state, LTE network 120 (e.g., a SGW) may terminate a downlink data path and then later trigger a paging process when downlink data arrives for UE 110. When a page is triggered, MME 140 may receive instructions to send a page to the targeted EU 110. In response to the paging instructions, pager 440 may review data from a smart paging list (e.g., generated/updated by smart paging list generator 430) to determine if a particular base station 130 and/or base station sector (e.g., within the tracking area list of for the UE) has been associated with UE 110 for the current time. If a particular base station 130 is associated with UE 110 in the smart paging list for the current time, pager 440 may direct a page to UE 110 via the particular base station 130. If a particular base station 130 is not associated with UE 110 in the smart paging list for the current time, pager 440 may direct a page to UE 110 via all base stations 130 in the current tracking area list for UE 110. Pager 440 may also manage paging retransmissions. In one implementation, if pager 440 does not achieve a successful page of UE 110 (e.g., as indicated by a response from UE 110 within a particular time period) after one or more attempts using a base station 130 from the smart paging list, pager 440 may retransmit the page using the current tracking area list.

Although FIG. 4 shows example functional components of MME 140, in other implementations, MME 140 may include fewer functional components, different functional components, differently arranged functional components, and/or additional functional components than depicted in FIG. 4. Alternatively, or additionally, one or more functional components of MME 140 may perform one or more other tasks described as being performed by one or more other functional components of MME 140.

FIG. 5 depicts a portion of an example data structure for a smart paging list 500 capable of being generated and used by MME 140. In one implementation, the data structure may be divided into separate tables, such as a separate table for each UE 110. FIG. 5 provides an example smart paging list 500 for one UE 110. In one implementation, the information provided in smart paging list 500 may be provided by MME 140 (e.g., smart paging list generator 430) or another device in network 120, and may be used by MME 140 (e.g., pager 440) or another device of network 120.

As illustrated in FIG. 5, smart paging list 500 may include information associated with UE (e.g., UE 110) that may be used to identify a particular base station likely to be serving the UE at particular times. For example, smart paging list 500 may include a profile identification (ID) field 510, a day field 520, a time field 530, a paging base station/sector field 540, and a variety of records or entries 550 associated with fields 510-540.

Profile ID field 510 may include a number (e.g., a ten-digit mobile directory number (MDN) or another identifier) associated with particular UE 110. Entries in smart paging list 500 may be associated with the number in profile ID field 510. For example, profile ID field 510 may include a number "555-555-1234."

Day field 520 and time field 530 may include periodic information to define when conditions in other fields (e.g., paging base station/sector field 540) should be performed. For example, day field 520 may identify a day (e.g., Monday, Tuesday, etc., as shown in example smart paging list 500.) or range of days, such as a business week (e.g., Mon. through Fri.) or a weekend. Time field 530 may include particular time periods within the days identified in day field 520. For example, time field 530 may identify working hours (e.g., "9:00-16:00" as shown in the first entry 550 of smart paging list 500) or evening hours (e.g., "00:00-08:15" and "16:45-23:59" as shown in the second entry 550 of smart paging list 500).

Paging base station/sector field 540 may include a base station identifier and a sector identifier for a base station 130 associated with UE 110 for the corresponding day/time in day field 520 and time field 530. For example, paging base station/sector field 540 may identify a base station using a unique (e.g., unique within all base stations assigned to MME 140) identifier (e.g., "45" and sector "3"). In another implementation, paging base station/sector field 540 may include identifiers for more than one base station and/or more than one sector.

Although FIG. 5 shows example information that may be provided in smart paging list 500, in other implementations, smart paging list 500 may contain less, different, differently arranged, or additional information than depicted in FIG. 5.

FIG. 6 is a flow chart of an example process 600 for efficiently paging user equipment according to an implementation described herein. In one implementation, process 600 may be performed by MME 140. In another implementation, some or all of process 600 may be performed by another device or group of devices, including or excluding MME 140.

As illustrated in FIG. 6, process 600 may include monitoring base station connections for each UE with respect to time (block 610). For example, in implementations described above in connection with FIG. 4, MME 140 (e.g., UE location logger 410) may retrieve connection information from, for example, UE registration and handover procedures to identify a particular base station 130 that provides service to the UE at particular times. In one implementation, UE location logger 410 may identify a particular sector of a base station 130 that provides service to the UE at a particular time.

Returning to FIG. 6, servicing base stations for each UE may be predicted for certain time periods (block 620), and a paging list may be generated for each UE based on the predicted servicing base station for the time periods (block 630). For example, in implementations described above in connection with FIG. 4, MME 140 (e.g., location pattern analyzer 420) may scan information from UE location logger 410 to determine statistically significant time periods when a UE (e.g., UE 110) can be predicted to be located within range of a base station 130 (or a base station sector). For example, a user of UE 110 may have consistent time periods at a place of business, at home, at a weekly meeting/event, etc. Location pattern analyzer 420 may identify what base station 130 (or base station sector) provides service to UE 110 during those consistent time periods. MME 140 (e.g., smart paging list generator 430) may generate a paging list, for each UE 110, that associates times (e.g., times that a page is to be sent to UE 110) with particular base stations 130 (or base station sectors). The paging list may be associated with one or more particular time periods (e.g., business hours, weekends, evenings, lunch times, etc.) detected by location pattern analyzer 420, such that different base stations 130 may be used for paging attempts at the different time periods.

Process 600 may include receiving paging instructions for a particular UE (block 640), and determining if a base station is identified in the paging list (block 650). For example, in implementations described above in connection with FIG. 4, when a page is triggered, MME 140 may receive instructions to send a page to the targeted UE 110. In response to the paging instructions, pager 440 may review data from a smart paging list (e.g., generated/updated by smart paging list generator 430) to determine if a particular base station 130 and/or base station sector (e.g., within the tracking area list of for the UE) has been associated with UE 110 for the current time.

Referring back to FIG. 6, if a base station is identified in the paging list (block 650—YES), a page may be sent to the UE via the base station identified in the paging list (block 660) and it may be determined if the page was successful (block 670). If the page is successful (block 670—YES), the process may end. If the page sent to the UE via the base station identified in the paging list is not successful (block 670—NO), or if a base station is not identified in the paging list (block 650—NO), a paged may be sent to the UE via base stations identified in the tracking area list (block 680). For example, in implementations described above in connection with FIG. 4, if a particular base station 130 is associated with UE 110 in the smart paging list for the current time, MME 140 (e.g., pager 440) may direct a page to UE 110 via the particular base station 130. If a particular base station 130 is not associated with UE 110 in the smart paging list for the current time, pager 440 may direct a page to UE 110 via all base stations 130 in the current tracking area list for UE 110. Pager 440 may also manage paging retransmissions. In one implementation, if pager 440 does not achieve a successful page of UE 110 (e.g., as indicated by a response from UE 110 within a particular time period) after one or more attempts using a base station 130 from the smart paging list, pager 440 may retransmit the page using the current tracking area list.

Systems and/or methods described herein may receive, at a particular time, instructions to send a page to user equipment. The systems and/or methods may determine, based on a paging list, if the user equipment is associated with a particular serving base station for the particular time. When the user equipment is associated with a particular serving base station for the particular time, the systems and/or methods may send the page to the user equipment via the particular serving base station. When the user equipment is not associated with a serving base station for the particular time, the systems and/or methods may send the page to the user equipment via all base stations associated with a tracking area list for the user equipment.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a mobility management entity (MME) computing device, the method comprising:
    monitoring, by the computing device, wireless network connections between user equipment and base stations;
    predicting, by the computing device and based on the monitoring by the computing device, serving base stations for user equipment for multiple particular time periods, where the predicting includes:
        identifying particular days and times when the user equipment is consistently attached to a first base station, and
        identifying different particular days and times when the user equipment is consistently attached to a second base station;
    generating, by the computing device and based on the predicting by the computing device, a paging list associating particular user equipment with particular serving base stations for the multiple particular time periods;
    receiving, by the computing device and at a particular time, instructions to send a page to the particular user equipment;
    determining, by the computing device and based on one of the multiple particular time periods of the paging list, if the particular user equipment is associated with one of the particular serving base stations for the particular time; and
    sending, by the computing device and when the paging list indicates that the particular user equipment is associated with one of the particular serving base stations for the particular time, the page to the particular user equipment via the one of the particular serving base stations.

2. The method of claim 1, further comprising
    sending, by the computing device and when the particular user equipment is not associated with one of the particular serving base stations for the particular time, the page to the particular user equipment via all base stations associated with a tracking area list for the particular user equipment.

3. The method of claim 1, further comprising:
    determining if the page sent via the one of the particular serving base stations is successful; and
    re-sending, the page to the particular user equipment via all base stations associated with a tracking area list for the particular user equipment when the page sent via the one of the particular serving base stations is not successful.

4. The method of claim 1, where the wireless network connections are connections using a Long Term Evolution (LTE) network.

5. The method of claim 1, where monitoring the wireless network connections between user equipment and base stations with respect to time includes:
    retrieving connection information from user equipment registration and handover procedures.

6. The method of claim 1, where predicting serving base stations for user equipment for multiple particular time periods includes predicting particular sectors of serving base stations, and where the paging list associating particular user equipment with the particular serving base stations for the particular multiple time periods includes the particular sectors.

7. The method of claim 1, where sending the page to the particular user equipment via the one of the particular serving base stations includes:
    sending the page via a particular sector of the one of the particular serving base stations.

8. A device, comprising:
    a memory to store a plurality of instructions; and
    a processor to execute instructions in the memory to:
        monitor wireless network connections between user equipment and base stations;
        predict, based on the monitoring, serving base stations for user equipment for multiple particular time periods, where the predicting includes:
            identifying particular days and times when the user equipment is consistently attached to a first base station, and identifying different particular days and times when the user equipment is consistently attached to a second base station;

generate, based on the predicting, a paging list associating particular user equipment with particular serving base stations for the multiple particular time periods;

receive, at a particular time, instructions to send a page to user equipment;

determine, based on one of the multiple particular time periods of the paging list, if the user equipment is associated with a particular serving base station for the particular time;

send, when the user equipment is associated with the particular serving base station for the particular time, the page to the user equipment via the particular serving base station; and send, when the user equipment is not associated with the particular serving base station for the particular time, the page to the user equipment via all base stations associated with a tracking area list for the user equipment.

9. The device of claim 8, where, when predicting serving base stations for the user equipment, the processor is further to execute instructions to:

identify statistically significant time periods when the user equipment is attached to the same base station.

10. The device of claim 8, where, when monitoring the wireless network connections between the user equipment and the base stations, the processor is further to execute instructions to:

retrieve connection information from registration and handover procedures associated with the user equipment.

11. The device of claim 8, where the processor is further to execute instructions to:

determine if the page sent via the particular serving base stations is not successful; and resend, the page to the user equipment via all base stations associated with the tracking area list when the page sent via the one of the particular serving base stations is not successful.

12. The device of claim 8, where the device is a mobility management entity (MME).

13. The device of claim 8, where, when sending the page to the user equipment via the particular serving base station, the processor is further to execute instructions to:

send the page via a particular sector of the particular serving base station.

14. A computer-readable memory comprising computer-executable instructions, the computer-readable memory comprising:

one or more instructions to generate, based on stored user equipment network connection data, a paging list associating user equipment with different serving base stations for multiple particular time periods, where the multiple particular time periods include:
particular days and times when the user equipment is consistently attached to a first base station, and
different particular days and times when the user equipment is consistently attached to a second base station;

one or more instructions to receive, at a particular time within one of the multiple particular time periods, instructions to page the user equipment; and one or more instructions to page the user equipment via a particular one of the different serving base stations for one of the multiple particular time periods in the paging list that corresponds to the particular time.

15. The computer-readable memory of claim 14, further comprising:

one or more instructions to retrieve the user equipment network connection data with respect to time; and one or more instructions to predict, based on the retrieved data, different serving base stations for the user equipment for different time periods.

16. The computer-readable memory of claim 15, where the user equipment network connection data includes connection information from user equipment registration and handover procedures within a Long Term Evolution (LTE) network.

* * * * *